United States Patent [19]

Komuro et al.

[11] 3,876,918

[45] Apr. 8, 1975

[54] ELECTRIC MOTOR CONTROLLING SYSTEM

[75] Inventors: Katsu Komuro; Nobuo Mitsui, both of Katsuta, Japan

[73] Assignee: Hitachi, Ltd., Tokyo, Japan

[22] Filed: Aug. 9, 1973

[21] Appl. No.: 387,040

[30] Foreign Application Priority Data
Aug. 14, 1973 Japan.............................. 48-80750

[52] U.S. Cl. ................ 318/203; 318/211; 318/227; 318/230
[51] Int. Cl. ........................................... A02p 1/40
[58] Field of Search .......... 318/203, 432, 211, 227, 318/230

[56] References Cited
UNITED STATES PATENTS
3,678,355    7/1972    Bucek et al...................... 318/203 R
3,767,987   10/1973    Mitsui et al........................ 318/203

*Primary Examiner*—G. Z. Rubinson
*Attorney, Agent, or Firm*—Craig & Antonelli

[57] ABSTRACT

An electric motor controlling system comprising an induction motor system consisting of at least one induction motor having motoring torque generating means and braking torque generating means, antiparallel connection of thyristors connected between an Ac source and the motoring torque generating means, means for controlling the thyristors such that the motoring torque generating means generates, when the speed deviation is positive, a motoring torque corresponding to the value of the speed deviation, a controllable rectifying circuit connected between the AC source and the braking torque generating means, means for controlling the controllable rectifying circuit such that the breaking torque generating means generates, when the speed deviation is negative, a braking torque corresponding to the value of the speed deviation, and means for giving the torques of the motor system a push-pull characteristic depending upon the speed deviation by biassing the two control means.

22 Claims, 5 Drawing Figures

ELECTRIC MOTOR CONTROLLING SYSTEM

The present invention relates to an electric motor controlling system, and more particularly, to a system for controlling both the motoring torque and the braking torque of an electric motor system consisting of at least one electric motor.

Induction motors are used in many fields of industry because of their general utility. In particular, they have been widely used in the fields which do not require precise speed control. Recently, with the advent of the thyristor, considerably precise speed control of the induction motor has become possible by combining with the thyristor.

For example, as to the elevator, the elevator of popular type has employed the induction motor, while the elevator of high class has employed the DC motor capable of easily performing precise speed control. However, if the speed control of the induction motor is performed by the use of the thyristor, considerably precise control can be ensured, and hence its application field is widening.

There are various modes of controlling the motoring torque of the induction motor by the use of the thyristor, among which one called the primary voltage control in which the voltage supplied from the AC source to the induction motor is controlled is most prevailing.

As the primary voltage control the following two methods are conceivable:

1. The method in which the thyristor is connected between the AC source and the induction motor; and
2. The method in which the AC source is connected to the primary winding of the induction motor and the thyristors are connected between the end terminals of individual phases of the primary winding.

Each of the above methods has various modifications. For example, the first method (1) has the variances a. The anti-parallel circuit of a thyristor and a unidirectional element, and
b. The anti-parallel circuit of a pair of thyristors.

These anti-parallel circuits are used in the three-phase control in which the anti-parallel circuit is connected to all the three phases, the two-phase control, or one-phase control.

Of course, there are many other variances of modifications.

On the other hand, as the method of controlling the braking torque of the induction motor using the thyristor i. The DC braking; and
ii. The regenerative braking are typical. When the braking torque is necessary as far as to a low speed region, the regenerative braking is unsuitable, but the DC braking is desirable.

In the field that the control of both motoring torque and braking torque is necessary such as the elevator, both motoring torque control system and braking torque control system are provided. These control systems are commonly changed over to each other between the motoring time and the braking time, and controlled depending on the difference between the set speed and the actual speed (hereinafter referred to as the speed deviation). That is, at the accelerating time of the elevator the primary voltage of the induction motor is controlled in accordance with the speed deviation, so that the speed of the elevator increases following the set speed. At the decelerating time of the elevator the DC braking current is controlled in accordance with the speed deviation, so that the elevator is decelerated following the set speed against its inertia.

This system has the following disadvantages:

1. Since the speed control at the deceleration time relies only on the control of the breaking torque, the inertia of the elevator including the motor must be considerably large because, if the inertia is small, the elevator may happen to stop before it reaches the set floor. To ensure that the elevator reaches the set floor, it is necessary to increase the moment of inertia of the motor. For this purpose, an inertial body may be mounted on the motor shaft, or the moment of inertial of the motor itself may be made large. As a result, a large motoring torque becomes necessary at the accelerating time, and it is necessary to absorb the thus accumulated inertial energy at the deceleration time by heat dissipation due to the DC braking. Consequently, the size of the motor becomes large from the consideration of the moment of inertia and the heat dissipation, while the capacity of the motor becomes large from the necessity of a large torque.

2. The control gain of each of the control of thhe motoring torque by the primary voltage control and the control of the braking torque by the DC braking is low and the performance thereof is bad in the state that the control deviation, for example the speed deviation is small. Consequently, even if the speed instruction becomes zero, the elevator cannot easily stop. For this reason, it is necessary to mechanically lock the elevator by an electromagnetic brake in the state that the elevator has a certain degree of speed to stop it. As a result, the elevator becomes uncomfortable to ride in. the uncomfortableness of the elevator to ride in also occurs at the switching point from motoring to braking.

An object of the present invention is to provide an electric motor controlling system enabling an electric motor system consisting at least one electric motor to maintain the set speed throughout from motoring to braking even when the moment of inertia of the motor shaft is small.

Another object of the present invention is to provide an electric motor controlling system, having a high control gain and good control performance even in the region of a low control input.

A further object of the present invention is to provide an electric motor controlling system comprising a thyristor and capable of controlling an induction motor system consisting of at least one induction motor with a high gain throughout from motoring to braking.

According to the present invention there is provided an electric motor controlling system comprising: an electric motor system consisting of at least one electric motor having a first means for generating a motoring torque and a second means for generating a braking torque; means for generating a torque control instruction; means for causing said first means to generate, when the output of said torque control instruction generating means is positive, a motoring torque corresponding to the value of said output; means for causing said second means to generate, when the output of said torque control instruction generating means is negative, a braking torque corresponding to the value of the latter output; and means acting on said means for causing to generate the motoring torque and said means for causing to generate the braking torque for giving the torques obtained by said first and second means a push-pull characteristic depending upon said torque control instruction.

The push-pull characteristic called herein means, as is well known, a combined output characteristic having a high gain continuous over a region of a control input from positive to negative value produced by a first means for generating a positive going output corresponding to the value of the control input when the control input is positive and by a second means for generating a negative going output corresponding to the value of the control input when the control input is negative such that, when the control input is in a region near zero, their outputs are in opposite directions to each other.

By constructing as above, the torque obtained by the motor system can be controlled as desired and the control performance becomes good even in a region of the control input near zero under any conditions.

Another feature of the present invention is the provision of the means for negatively feeding the electrical quantity relating to the torque obtained by one of the motoring torque generating means and the braking torque generating means of the motor system back to the control system of the other.

By the above feature, the control gain at a region of the control input around zero can be further increased.

A further feature of the present invention is that the motor system comprises a first and second motors, the first and second motors include induction motors and the torque control means of these induction motors include thyristors.

By the latter feature, a completely continuous torque control of the induction motors can be made in a contactless manner over a wide range from motoring to braking.

The above and other objects, features, and advantages of the present invention will become more apparent from the following detailed description of the preferred embodiment of the present invention made by way of example only when taken in conjunction with the accompanying drawings, in which.

Figure 1:
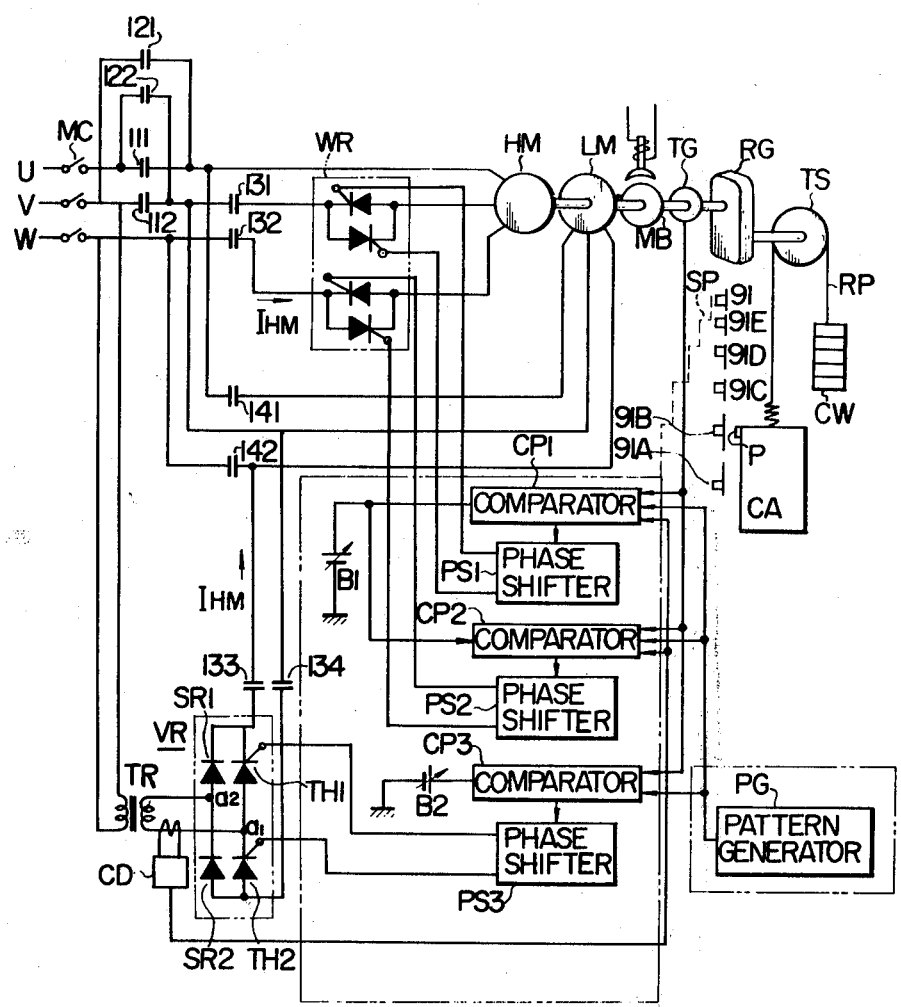
FIG. 1 is a schematic circuit diagram of an embodiment of the motor control system according to the present invention as applied to an elevator driving system.

Referring to FIG. 1, an elevator car CA and a counter weight CW are suspended from a traction sheave TS on opposite sides to each other by a rope RP. The traction sheave TS is coupled to induction motors HM and LM through a reduction gear RG, a tachometer generator TG, and an electromagnetic brake MB.

The high speed induction motor HM and the low speed induction motor LM are directly coupled. However, a pair of induction motors are not always necessary, but instead a pair of windings serving respectively as the motoring torque generating means and the braking torque generating means may be provided in one induction motor. Commonly, the latter will be prevailing.

To a three phase AC source U, V, W contacts 111 and 112 which close when the elevator runs up and contacts 121 and 122 which close when the elevator runs down are connected through a main contact MC. Further, contacts 131 and 132 which close at the time of ordinary running are connected in the source circuit. Between these contacts and the high speed induction motor HM a primary voltage controller WR is connected. The primary voltage controller WR consists of an anti-parallel circuit of thyristors. FIG. 1 shows an example of the two phase control.

A low speed run of the elevator at a maintenance and inspection time is indispensable in addition to ordinary service run for passenger. For this reason, it has been common for the elevator utilizing an induction motor as its driving source to be equipped with a high speed induction motor HM with a small number of poles to be used at motoring and high speed operation time and a low speed induction motor LM with a larger number of poles. The low speed induction motor LM was also partly used for braking at deceleration time.

In the present invention, it is unnecessary to especially employ a low speed induction motor LM. However, when the present invention is applied to the existing elevator facilities, there is the advantage that the low speed induction motor LM can be utilized as it stands, and particularly at the DC braking, a large braking torque can be provided because of the large number of poles of the induction motor LM.

Contactors 141 and 142 inserted between the AC source and the low speed induction motor LM are closed at the time of the maintenance and inspection running.

A DC braking circuit consisting of a transformer TR, a controllable rectifying circuit VR, and contactors 133 and 134 to be closed at the service running is connected between two terminals of the three phase AC source and two terminals of the low speed induction motor LM.

The controllable rectifying circuit VR is a bridge rectifying circuit consisting of a pair of thyristors TH1 and TH2 connected in series on opposite sides of one AC side terminal $a1$ and a pair of unidirectional elements such as silicon rectifying elements SR1 and SR2 connected in series on opposite sides of the other AC side terminal $a2$. According to the above construction, when the AC voltage applied between the AC terminals $a1$ and $a2$ is low, there is the advantage that the flywheel effect occurs and the fluctuation of the DC braking torque is reduced because the electromagnetic energy produced in the low speed induction motor LM can flow through the unidirectional elements SR1 and SR2.

The above description is as to the main circuit. A description of the control system will next be made with reference to FIGS. 1 and 2.

Figure 2:
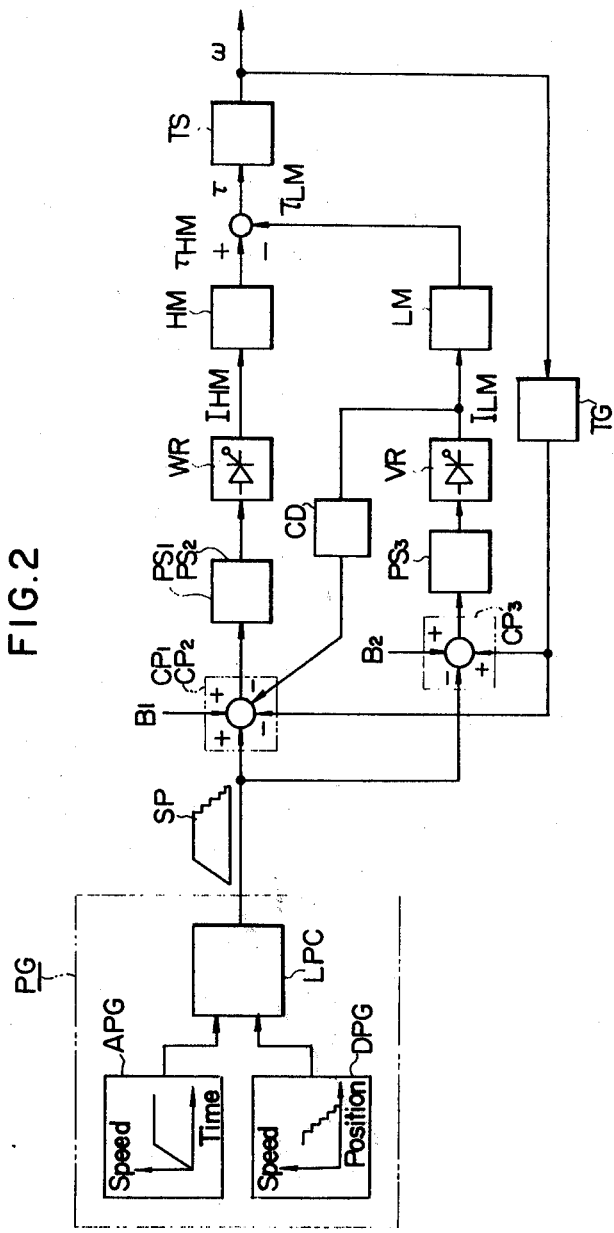
FIG. 2 is a block diagram of the system of FIG. 1.

A pattern generator PG consists of an acceleration pattern generator APG which provides an output increasing with the time, a deceleration pattern generator DPG which provides an output decreasing with the position of the elevator, and a lower priority circuit LPC which provides preferentially a lower one of the outputs of the acceleration and deceleration pattern generators APG and DPG as a speed instruction SP as shown in FIG. 2. The deceleration pattern generator DPG is provided with a detection board 91A to 91E and 91 arranged in the elevator passage and a position detector P arranged on the elevator car, the position detector P producing at the deceleration time a stepwise decreasing output by detecting the detection board sequentially as shown in FIG. 1.

The output of the pattern generator PG is applied to three comparators CP1, CP2, and CP3 as their one input, and the other input is supplied as a speed feedback by the tachometer generator TG. The outputs of these comparators CP1, CP2, and CP3 are supplied to phase shifters PS1, PS2, and PS3 and phase control the thyristors in the primary voltage controller WR and the controllable rectifying circuit VR. These elements construct a speed control system.

Figure 3:
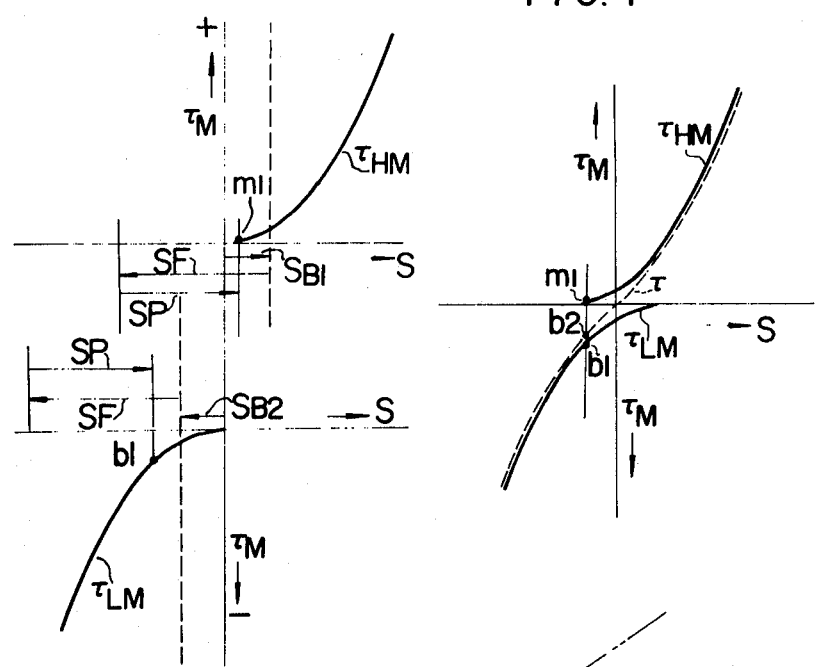
FIGS. 3 and 4 are speed deviation versus motor torque characteristics for explaining the present invention.

Consequently, the motoring torque and the braking torque are controlled in accordance with the speed deviation S. The speed deviation S versus torque $\tau_M$ characteristic for the motoring torque and the braking torque is shown in FIG. 3 as curves $\tau_{HM}$ and $\tau_{LM}$, respectively. The high speed induction motor HM produces the positive torque (motoring torque) only during the positive period of the speed deviation S, while the low speed induction motor LM produces the negative torque (braking torque) only during the negative period of the speed deviation S.

Considering the positive and negative regions of the speed deviation S, the torque curves $\tau_{HM}$ and $\tau_{LM}$ are connected with each other to provide a continuous torque curve from motoring to braking. Consequently, even when the elevator cannot reach the set point by controlling only the braking torque because of a small inertial energy at the deceleration time of the elevator, the speed control to the set point accurately following the speed instruction is possible since the high speed induction motor HM can produce the motoring torque $\tau_{HM}$ due to the fact that the speed deviation S is positive. Thus, it is unnecessary to increase the moment of inertia of the motor shaft, and the increase in the capacity of the motor and heat loss can be prevented.

However, as is apparent from FIG. 3, the variation in the torque is small in a region of the speed deviation S around zero. Consequently, the response to the variation in the speed instruction is slow. In particular, even if the speed instruction becomes zero immediately before the stoppage of the elevator, the speed deviation S is small, so that the elevator would not readily stop as described above.

Accordingly, the present invention gives the pushpull characteristic to the torques of the motoring torque control system and the braking torque control system for the control input. By applying biases B1 and B2 to the comparators CP1 and CP2, CP3, respectively, the speed deviation S is biased on the coordinate system of FIG. 3. As a result, the axis of ordinates S = 0 is shifted as indicated by dotted lines by the amounts of bias SB1 and SB2. Thus, when the amount of the speed feedback is SF, for example, for the speed instruction SP (SP<SF), the braking torque control system produces the braking torque at a point $b_1$, and the motoring torque control system produces the motoring torque at a point $m_1$. If these are written on the same coordinate system, both motoring torque $\tau_{HM}$ and braking torque $\tau_{LM}$ are produced in a region of the speed deviation S around zero, and the combined torque of the directly coupled induction motors HM and LM becomes a torque curve having a high gain even in that region of the speed deviation S as shown by a dotted line in FIG. 4. The combined torque for the speed instruction SP and the speed feedback amount SF is at a point $b_2$, the braking torque.

Consequently, the speed response of the elevator to the speed instruction is quick, and when the speed instruction becomes zero, the elevator can be quickly stopped. As a result, it becomes unnecessary to apply the electromagnetic brake MB in the state of a relatively high speed immediately before the stoppage of the elevator, so that the vibration of the elevator car CA is prevented and comfortableness to ride in is improved.

The biases B1 and B2 are not always necessary to be applied to both control systems, nor to be of the same value when applied to both control systems. In setting these values, offset errors or the like are to be taken into consideration. Also, it is possible to eliminate the biases by selecting the characteristics of the phase shifters.

In order to further improve the control gain, it is desirable to negatively feed an electrical quantity relating to the motoring or braking torque back to the other torque control system. In the embodiment described, a current detector CD for detecting the braking current is provided, and the output thereof is negatively fed back to the comparators CP1 and CP2.

Figure 4:
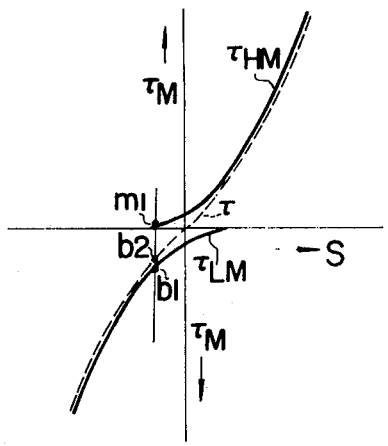

By constructing as above, when the braking torque $\tau_{LM}$ is produced, it functions to decrease the motoring torque $\tau_{HM}$. In FIG. 4, when the speed deviation S comes to the region at which the braking torque is produced while it is gradually decreasing from a sufficiently large positive region, the motoring torque $\tau_{HM}$ is depressed to a value less than the characteristic represented by the solid line, so that the slope, i.e. gain of the combined torque $\tau$ becomes larger than that represented by the dotted line to improve the controlability. Also, it is possible to construct crosswise by negatively feeding the electrical quantity relating to the motoring torque also back to the braking torque control system.

Figure 5:
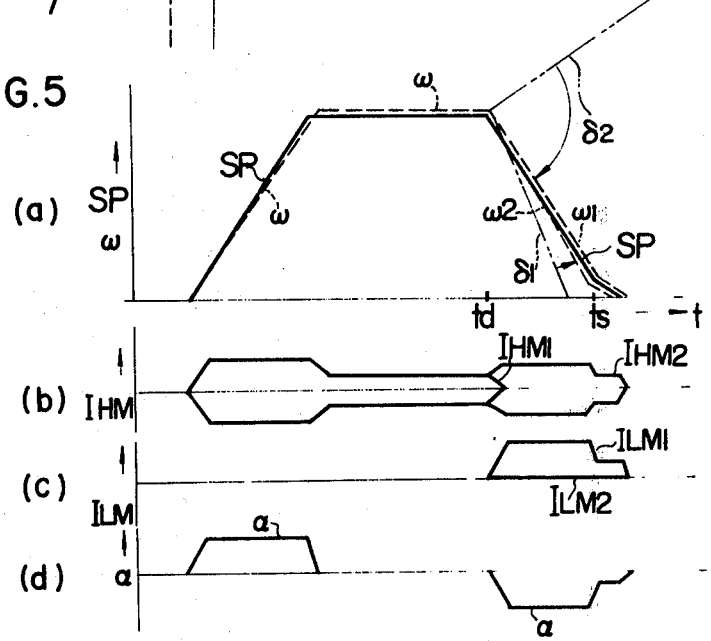
FIG. 5 is speed, current, and acceleration waveforms relative to time for explaining the operation of the elevator.

FIG. 5 is a waveform diagram for explaining the operation of the elevator controlled by the arrangement of FIG. 1.

First, at the starting and accelerating time, the speed instruction SP and the speed feedback value SF are compared in the comparators CP1 and CP2. The motoring torque $\tau_{HM}$ is controlled in accordance with the deviation between the speed instruction SP and the speed feedback value SF by the primary voltage control device WR through the phase shifters PS1 and PS2. Consequently, the elevator speed $\omega$ increases following the speed instruction SP, and never fluctuates with the direction and value of the load. At this time, the current $I_{HM}$ of the high speed induction motor HM is an alternating current in the positive and negative directions as shown at (b) in FIG. 5, and the acceleration of the elevator $\alpha$ varies as shown at (d) in FIG. 5.

Next, when the accelerated elevator reached the deceleration starting position before the set floor at the time td, the speed instruction SP decreases depending on the position of the elevator as described above. At this time, since the moment of inertia of the motor shaft is selected small, the elevator speed is scattered between $\delta_1$ and $\delta_2$ depending on the weight ratio between the elevator car CA and the counter weight CW in an uncontrolled state. This is to be pulled in the speed instruction SP as indicated by the arrow at (a) in FIG. 5 by the torque characteristic τ in FIG. 4. For example, for pulling a speed apt to become $\delta_2$ at such a time as unloaded running up or heavy loaded running down of the elevator in a speed $\omega_1$, a large torque is not necessary because the moment of inertia is small as described above. Moreover, since the gain of the torque characteristic in the region of a small speed deviation S in high, it is possible to approximate the elevator speed $\omega_1$ to the speed instruction SP with a high accuracy. Consequently, the floor reaching level can be made accurate.

In FIG. 5, 1 is suffixed to reference characters for the elevator load torque in the negative direction, while 2 is suffixed to the elevator load torque in the positive direction. For example, in the case of the load torque in the negative direction, the low speed induction motor LM is supplied with a DC braking current $I_{LM1}$ because a braking torque is necessary for preventing overshoot, while in the case of the load torque in the positive direction such as $\delta_1$, the high speed induction motor HM is supplied with an acceleration current $I_{HM2}$ but hardly with a DC braking current $I_{LM2}$ because conversely the motoring torque is necessary at the deceleration time.

In this manner the elevator decelerates and at a time $t_s$ at which the speed approaches zero the electromagnetic brake MB is operated. In this case the speed is sufficiently low, the acceleration $\alpha$ decreases as shown at $(d)$ in FIG. 5, the vibration of the elevator car CA is weak, and the riding is comfortable.

In the embodiment of the present invention a first electric motor for producing a motoring torque may be any kind of electric motor. However, from the structural simplicity and inexpensiveness consideration, it is most suitable to employ an induction motor with the primary voltage control by a thyristor.

As a second electric motor for producing a braking torque, an induction motor with a DC braking control is most suitable for a similar reason. However, a DC motor may also be utilized.

Also, in the above embodiment a description has been made of the speed deviation in the speed feedback control as the torque control input. However, the present invention is also applicable to the case of the feedback of the positional signal and the instruction of the torque itself.

What we claim is:

1. An electric motor controlling system comprising:
    an electric motor system consisting of at least one electric motor having a first means for generating a motoring torque and a second means for generating a braking torque;
    means for generating a torque control instruction;
    means for causing said first means to generate, when the output of said torque control instruction generating means is positive, a motoring torque corresponding to the value of said output;
    means for causing said second means to generate, when the output of said torque control instruction generating means is negative, a braking torque corresponding to the value of the latter output; and
    means acting on said means for causing to generate the motoring torque and said means for causing to generate the braking torque for giving the torques obtained by said first and second means a push-pull characteristic depending upon said torque control instruction.

2. An electric motor controlling system according to claim 1, further comprising:
    means for detecting an electrical quantity relating to the produced torque of at least one of said first and second means; and
    means for negatively feeding the output of said detecting means back to said torque generation causing means for the other of said first and second means.

3. An electric motor controlling system according to claim 2, wherein said torque generation causing means receiving the negatively fed back output of said detecting means is responsive thereto for reducing the torque generated thereby.

4. An electric motor controlling system according to claim 1, in which said electric motor system comprises a first and a second electric motor interconnected with each other serving respectively as said first and second means.

5. An electric motor controlling system according to claim 4, in which said first electric motor comprises an induction motor, and said motoring torque generation causing means comprises an AC source and thyristors connected between said AC source and said induction motor.

6. An electric motor controlling system according to claim 4, in which said second electric motor comprises an induction motor, and said braking torque generation causing means comprises an AC source and a controllable rectifying circuit connected between said AC source and said induction motor.

7. An electric motor controlling system according to claim 6, in which said rectifying circuit comprises:
    a pair of thyristors connected in series on opposite sides of one AC side terminal; and
    a pair of unidirectional elements connected in series on opposite sides of the other AC side terminal.

8. An electric motor controlling system according to claim 1, in which said electric motor system comprises one electric motor having a first winding and a second winding serving respectively as said first and second means.

9. An electric motor controlling system according to claim 8, in which said electric motor comprises an induction motor, and said motoring torque generation causing means comprises an AC source and thyristors connected between said AC source and said first winding.

10. An electric motor controlling system according to claim 8, in which said electric motor comprises an induction motor, and said braking torque generation causing means comprises an AC source and a controllable rectifying circuit connected between said AC source and said second winding.

11. An electric motor controlling system according to claim 10, in which said rectifying circuit comprises:
    a pair of thyristors connected in series on opposite sides of one AC side terminal; and
    a pair of unidirectional elements connected in series on opposite sides of the other AC side terminal 12. An electric motor controlling system according to claim 1, wherein said means for giving a push-pull characteristic enable the simultaneous generation of both motoring and braking torques in a predetermined range.

13. An electric motor controlling system comprising:

an electric motor system consisting of at least one electric motor having a first means for generating a motoring torque and a second means for generating a braking torque;

a pattern generator for generating a speed instruction;

means for detecting the speed of said electric motor;

a comparator for comparing the output of said pattern generator with the output of said speed detecting means;

means for causing said first means to generate, when the output of said comparator is positive, a motoring torque corresponding to the value of said output;

means for causing said second means to generate, when the output of said comparator is negative, a braking torque corresponding to the value of the latter output; and means acting on said means for causing to generate the motoring torque and said means for causing to generate the braking torque for giving the torques obtained by said first and second means a push-pull characteristic depending upon the output of said comparator.

14. An electric motor controlling system according to claim 13, in which said pattern generator comprises:

an acceleration pattern generator for generating a speed instruction increasing with time;

a deceleration pattern ggenerator for generating an output decreasing as a function of the position of a load coupled to said electric motor; and means for preferentially outputting a lower one of the supplied output of said acceleration pattern generator and output of said deceleration pattern generator.

15. An electric motor controlling system according to claim 13, in which said push-pull characteristic giving means comprises means for applying bias to at least one of said motoring torque generation causing means and said braking torque generation causing means.

16. An electric motor controlling system according to claim 13, in which said electric motor system comprises a first and a second electric motors interconnected with each other serving respectively as said first and second means.

17. An electric motor controlling system according to claim 13, in which said electric motor system comprises one electric motor having a first winding and a second winding serving respectively as said first and second means.

18. An electric motor controlling system according to claim 13, wherein said means for giving a push-pull characteristic enable the simultaneous generation for both motoring and braking torques in a predetermined range.

19. An electric motor controlling system comprising:

a pair of induction motors having different numbers of poles and interconnected with each other;

a pattern generator for generating a speed instruction;

means for detecting the speed of said induction motor;

a comparator for comparing the output of said pattern generator with the output of said speed detecting means;

means for causing said induction motor with a lower number of poles to generate, when the output of said comparator is positive, a motoring torque corresponding to the value of said output;

means for causing said induction motor with a higher number of poles to generate, when the output of said comparator is negative, a braking torque corresponding to the value of the latter output; and means acting on said means for causing to generate the motoring torque and said means for causing to generate the braking torque for giving the torques of both said motors a push-pull characteristic depending upon the output of said comparator.

20. An electric motor controlling system according to claim 19, wherein said means for giving a push-pull characteristic enable the simultaneous generation of both motoring and braking torques in a predetermined range.

21. An electric motor controlling system comprising:

a pair of induction motors having different numbers of poles and interconnected with each other;

a pattern generator for generating a speed instruction;

means for detecting the speed of said induction motor;

a comparator for comparing the output of said pattern generator with the output of said speed detecting means;

means including an AC source and thyristors connected between said AC source and said induction motor with a lower number of poles for causing said induction motor to generate, when the output of said comparator is positive, a motoring torque corresponding to the value of said output;

means including an AC source and a controllable rectifying circuit connected between said AC source and said induction motor with a higher number of poles for causing the latter induction motor to generate, when the output of said comparator is negative, a braking torque corresponding to the value of the latter output; and means acting on said means for causing to generate the motoring torque and means for causing to generate the braking torque for giving the torques of both said motors a push-pull characteristic depending upon the output of said comparator.

22. An electric motor controlling system according to claim 21, wherein said means for giving a push-pull characteristic enable the simultaneous generation of both motoring and braking torques in a predetermined range.

* * * * *